United States Patent
Liu et al.

(10) Patent No.: US 12,338,607 B2
(45) Date of Patent: Jun. 24, 2025

(54) AIR MOISTURE COLLECTION DEVICE AND METHOD

(71) Applicant: CHANG'AN UNIVERSITY, Xi'an (CN)

(72) Inventors: Xiuhua Liu, Xi'an (CN); Chaochao Guo, Xi'an (CN); Yi He, Xi'an (CN); Ce Zheng, Xi'an (CN); Yandong Ma, Xi'an (CN); Zhifeng Jia, Xi'an (CN); Anyan Hu, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 476 days.

(21) Appl. No.: 17/711,052

(22) Filed: Apr. 1, 2022

(65) Prior Publication Data

US 2023/0313506 A1 Oct. 5, 2023

(51) Int. Cl.
*E03B 3/28* (2006.01)
*B01D 5/00* (2006.01)
*B01D 53/26* (2006.01)

(52) U.S. Cl.
CPC .............. *E03B 3/28* (2013.01); *B01D 5/0015* (2013.01); *B01D 5/0051* (2013.01); *B01D 5/009* (2013.01); *B01D 53/265* (2013.01)

(58) Field of Classification Search
CPC ...... G01N 1/2294; E03B 3/28; B01D 5/0042; B01D 5/0015; F24F 3/14; F24F 2003/1446
See application file for complete search history.

(56) References Cited

U.S. PATENT DOCUMENTS

| | | | | |
|---|---|---|---|---|
| 7,044,421 | B1 * | 5/2006 | Orndoll | A47K 10/36 242/563 |
| 2004/0040322 | A1 * | 3/2004 | Engel | E03B 3/28 62/177 |
| 2014/0216069 | A1 * | 8/2014 | Koivuluoma | F25D 21/14 62/176.1 |
| 2016/0145838 | A1 * | 5/2016 | Turner, Jr. | B01D 5/0015 62/3.4 |
| 2018/0163980 | A1 * | 6/2018 | Lee | F24F 5/0021 |

FOREIGN PATENT DOCUMENTS

CN 201110975 Y * 9/2008

OTHER PUBLICATIONS

CN201110975Y Translation (Year: 2008).*

* cited by examiner

*Primary Examiner* — Schyler S Sanks

(57) ABSTRACT

The present disclosure discloses an air moisture collection device and method. The air moisture collection device comprises a shell, a condensing device, a water outlet pipe and a base, wherein the bottom of the shell is connected with the top of the base, an inner container is arranged in the shell, a water collecting bottle is arranged in the base, the bottom of the inner container communicates with the water collecting bottle through the water outlet pipe, and the water outlet pipe is provided with a water outlet pipe sealing valve; the condensing device is arranged between the shell and the inner container; an air inlet pipe, an exhaust pipe, a control device and an energy device are arranged on the side wall of the shell; and the control device and the energy device are both connected with the condensing device.

8 Claims, 3 Drawing Sheets

AIR MOISTURE COLLECTION DEVICE AND METHOD

TECHNICAL FIELD

The present disclosure belongs to the technical field of air condensation water production, and relates to an air moisture collection device and method.

BACKGROUND ART

Soil is a porous multi-phase (solid, liquid and gas three-phase) loose material developed from rock weathered matters and quaternary sediments, which has certain fertility and can support plant growth. The soil water content is an important factor for deciding vegetation growth. The transport of water in soil includes two flow states of liquid water and water vapor and their conversion process. Thus, the collection and measurement of air moisture in near-ground and soil porosity are important modes for accurately measuring the water content in the soil.

In the prior art, when air moisture is collected, air is generally directly extracted from soil through a compressor and an evaporator which take electricity or fuel oil as energy, and air moisture is separated from the air by condensation mode and collected but the technology needs to consume a large amount of energy. In addition, for energy a motor can be driven in a solar power generation mode so as to drive the compressor to work, but the mode needs a high-end technology for operation and high field operation and maintenance cost, and is not suitable for widespread popularization. Moreover, the specific layer horizon of the air source cannot be guaranteed when the pump is adopted for pumping air, and water vapor research of the precise layer horizon is difficult to carry out. Maybe this problem can be solved if the device is buried in the specified depth of soil, while this method is not only time-consuming and inconvenient, but also has a large disturbance to the soil, which cannot exclude the influence of excavation disturbance on the experimental and measurement results, and is not conducive to the high-frequency detection of water vapor.

Along with further researches on water vapor, scientific researchers urgently need an accurate, pollution-free and convenient air moisture collection device and method.

SUMMARY

The present disclosure aims to overcome the defects that in the prior art, air moisture collection is large in energy consumption, complex in use and incapable of guaranteeing the specific location or layer of an air source, and provides an air moisture collection device and method.

In order to achieve the above purpose, the present disclosure implements the following technical scheme:

An air moisture collection device comprises a shell, a condensing device, a water outlet pipe and a base;

the bottom of the shell is connected with the top of the base, an inner container is arranged in the shell, a water collecting bottle is arranged in the base, the bottom of the inner container communicates with the water collecting bottle through the water outlet pipe, and the water outlet pipe is provided with a water outlet pipe sealing valve; the condensing device is arranged between the shell and the inner container, one end of the condensing device is tightly attached to the inner wall of the shell, the other end of the condensing device is tightly attached to the outer wall of the inner container, and the condensing device is used for condensing moisture in air inside the inner container;

an air inlet pipe, an exhaust pipe, a control device and an energy device are arranged on the side wall of the shell, the air inlet pipe and the exhaust pipe both communicate with the interior of the inner container, the air inlet pipe is provided with an air inlet pipe sealing valve, and the exhaust pipe is provided with an exhaust pipe sealing valve; and the control device and the energy device are both connected with the condensing device, the control device is used for opening or closing the condensing device, and the energy device is used for providing working energy for the condensing device.

Further improvement of the air moisture collection device in the present disclosure is as follows:

The air moisture collection device further comprises a heating device connected with the energy device and the control device, one end of the heating device is tightly attached to the inner wall of the shell, the other end of the heating device is tightly attached to the outer wall of the inner container, the control device is further used for turning on or turning off the heating device, and the energy device is further used for providing working energy for the heating device.

The condensing device comprises a plurality of first semiconductor chilling plates, the heating device comprises a plurality of second semiconductor chilling plates, the refrigerating surfaces of the first semiconductor chilling plates are tightly attached to the outer wall of the inner container, and the heating surfaces of the first semiconductor chilling plates are tightly attached to the inner wall of the shell; the heating surfaces of the second semiconductor chilling plates are tightly attached to the outer wall of the inner container, and the refrigerating surfaces of the second semiconductor chilling plates are tightly attached to the inner wall of the shell; and all the first semiconductor chilling plates and all the second semiconductor chilling plates are connected with the energy device.

The first semiconductor chilling plates and the second semiconductor chilling plates are distributed between the shell and the inner container in a staggered mode.

The energy device comprises a battery placing box, a storage battery and an electric quantity indicating lamp, the battery placing box is connected with the outer wall of the shell, the storage battery is located in the battery placing box and connected with the condensing device and the electric quantity indicating lamp, the electric quantity indicating lamp is arranged on the outer wall of the control device, the shell or the battery placing box, and when the electric quantity of a storage battery is greater than or equal to 5% and smaller than 20%, the electric quantity indicating lamp is yellow; when the electric quantity of storage battery is smaller than 5%, the electric quantity indicating lamp is red; and the electric quantity of storage battery is greater than or equal to 20%, the electric indicating lamp is green.

The valve control ends of the air inlet pipe sealing valve, the exhaust pipe sealing valve and the water outlet pipe sealing valve are all located outside the shell.

A hydrophobic layer is arranged on the inner wall of the inner container, and the shell is a hollow reticular shell.

The air moisture collection device further comprises a heat dissipating device, wherein the heat dissipating device comprises a fan and a silicone grease layer; one end of the fan is fixedly connected with the shell, and the other end of the fan is connected with the condensing device through the silicone grease layer; and the fan is connected with the control device and the energy device, the control device is used for turning on or turning off the fan, and the energy device is further used for providing working energy for the fan.

A plurality of supporting columns are arranged on the surface of the bottom of the base.

On the other hand, an air moisture collection method comprises the following steps:
- S1, closing a water outlet pipe sealing valve and an air inlet pipe sealing valve, opening an exhaust pipe sealing valve, and exhausting air in the inner container through an exhaust pipe;
- S2, after all the air in the inner container is pumped out, closing the exhaust pipe sealing valve, and installing the air moisture collection device at a preset position; and
- S3, opening the water outlet pipe sealing valve, the air inlet pipe sealing valve and the condensing device, and when the water amount in the water collecting bottle reaches a preset value, closing the water outlet pipe sealing valve, taking out the water collecting bottle and storing the water collecting bottle in a serial number manner.

Compared with the prior art, the present disclosure has the following beneficial effects:

According to the air moisture collection device, the inner container is arranged in the shell, the condensing device is arranged between the shell and the inner container, one end of the condensing device is tightly attached to the inner wall of the shell, the other end of the condensing device is tightly attached to the outer wall of the inner container, water vapor in air in the inner container is condensed through the condensing device, and the water vapor is collected through the water collecting bottle arranged in the base, so that air moisture collection is realized. Wherein the air inlet pipe and the exhaust pipe are arranged on the side wall of the shell, the air inlet pipe sealing valve and the exhaust pipe sealing valve are arranged on the air inlet pipe and the exhaust pipe respectively, and the air inlet pipe and the exhaust pipe can be sealed when needed through the air inlet pipe sealing valve and the exhaust pipe sealing valve, so that the air inlet pipe is sealed; the air in the inner container is evacuated through the exhaust pipe, it is guaranteed that the air is not affected by other gases, the result accuracy is guaranteed, the air inlet pipe is directly connected to the target horizon, the air in the target horizon is directly collected through the air inlet pipe, interference of air in other horizons is avoided, it is guaranteed that the air entering the inner container is the air in the target horizon, and it is guaranteed that gaseous water of the horizon to be researched is finally collected, large-area excavation is avoided, accurate horizon air moisture collection can be achieved, sampling accuracy is improved, soil disturbance is reduced, high-frequency detection is facilitated, manual workload is effectively reduced, field operation is convenient, the cost is low, and the practicability is high.

Further, the heating device connected with the energy device and the control device is arranged, one end of the heating device is tightly attached to the inner wall of the shell, the other end of the heating device is tightly attached to the outer wall of the inner container, the heating device is applied to cleaning work of the inner container, and the inner wall is flushed with purified water before the heating device is used and after water is collected at one time. After flushing water is released, part of water stays on the inner wall of the inner container, the heating device heats the inner container to enable the water staying on the inner wall of the inner container to be completely evaporated, and the influence of substances in the inner container on experiments is avoided.

Further, the condensing device comprises a plurality of first semiconductor chilling plates, the heating device comprises a plurality of second semiconductor chilling plates, and the semiconductor chilling plates have the characteristics of quick reaction, one heating surface and one refrigerating surface, and meanwhile, the generated temperature difference is relatively large. The semiconductor chilling plates are used for rapidly refrigerating and heating the inner container of the device, so that the collection time is shortened, and the working efficiency is improved.

Further, the first semiconductor chilling plates and the second semiconductor chilling plates are distributed between the shell and the inner container in a staggered mode, and the staggered arrangement mode enables refrigeration and heating of the inner container to be more uniform.

Further, the electric quantity indicating lamp is arranged, the electric quantity of the storage battery is judged according to the color of the electric quantity indicating lamp, and a user is reminded to replace the storage battery in time.

Further, the valve control ends of the air inlet pipe sealing valve, the exhaust pipe sealing valve and the water outlet pipe sealing valve are all located outside the shell, so that the operation is facilitated.

Further, a hydrophobic layer is arranged on the inner wall of the inner container so that the collection of condensed water inside the inner container is facilitated, and the shell is in a hollow reticular design so that the purposes of ventilation and heat dissipation are achieved.

Further, the air moisture collection device further comprises a heat dissipating device, wherein the heat dissipating device comprises a fan and a silicone grease layer; the fan is connected with the control device and the energy device; and one end of the fan is fixedly connected with the condensing device through the silicone grease layer, and the other end of the fan is fixed to the shell, so that the heat dissipation is quickened, and the condensing effect is improved.

Further, a plurality of supporting columns are arranged on the surface of the bottom of the base, and the supporting columns can easily stretch into the interior of soil, so that installation and placement under different outdoor conditions are facilitated.

According to the air moisture collection method, by cleaning the inner container and heating and refrigerating the semiconductor chilling plates, vapor water is rapidly, repeatedly and accurately collected from different horizons in the field in a short time, the inner container is cleaned before being used, the influence of internal substances on a collection result is avoided, and large temperature difference is caused in a short time through the semiconductor chilling plates, so that moisture in the air can be quickly condensed, and a sufficient amount of moisture can be collected. Meanwhile, the sampling horizon is accurately controlled through the guide pipe, so that the experimental result is more accurate.

REFERENCE SIGNS 100, air inlet pipe;
200, exhaust pipe;
300, control device;
400, energy device;
500, shell;
600, condensing device;
700, inner container;
800, water outlet pipe;
900, base;
1000, water collecting bottle;
1100, supporting column;
1200, air inlet pipe sealing valve;
1300, exhaust pipe sealing valve;
1400, water outlet pipe sealing valve;
1500, heating button;
1600, refrigerating button;
1700, electric quantity indicating lamp; and
1800, exhaust pump.

DETAILED DESCRIPTION OF THE EMBODIMENTS

To make a person skilled in the art understand the technical solutions in the present disclosure better, the following clearly and completely describes the technical solutions in the embodiments of the present disclosure with reference to the attached figures in the embodiments of the present disclosure. Apparently, the described embodiments are merely some rather than all of the embodiments of the present disclosure. All other embodiments obtained by those skilled in the art based on the embodiments of the present disclosure without creative efforts shall fall within the protection scope of the present disclosure.

It needs to be noted that in the specification, claims, and attached figures of the present disclosure, the terms such as "first" and "second" are intended to distinguish between similar objects but do not necessarily indicate a specific order or sequence. It should be understood that the data termed in such a way are interchangeable in proper circumstances, so that this embodiment of the present disclosure described herein can be implemented in other orders than the order illustrated or described herein. In addition, the terms "comprise", "have", and any other variant thereof are intended to cover a non-exclusive inclusion. For example, a process, method, system, product, or device that comprises a list of steps or units is not necessarily limited to those steps or units that are expressly listed, but may comprise other steps or units that are not expressly listed or are inherent to the process, method, system, product, or device.

The present disclosure is further described in details below in combination with the attached figures.

Figure 1:
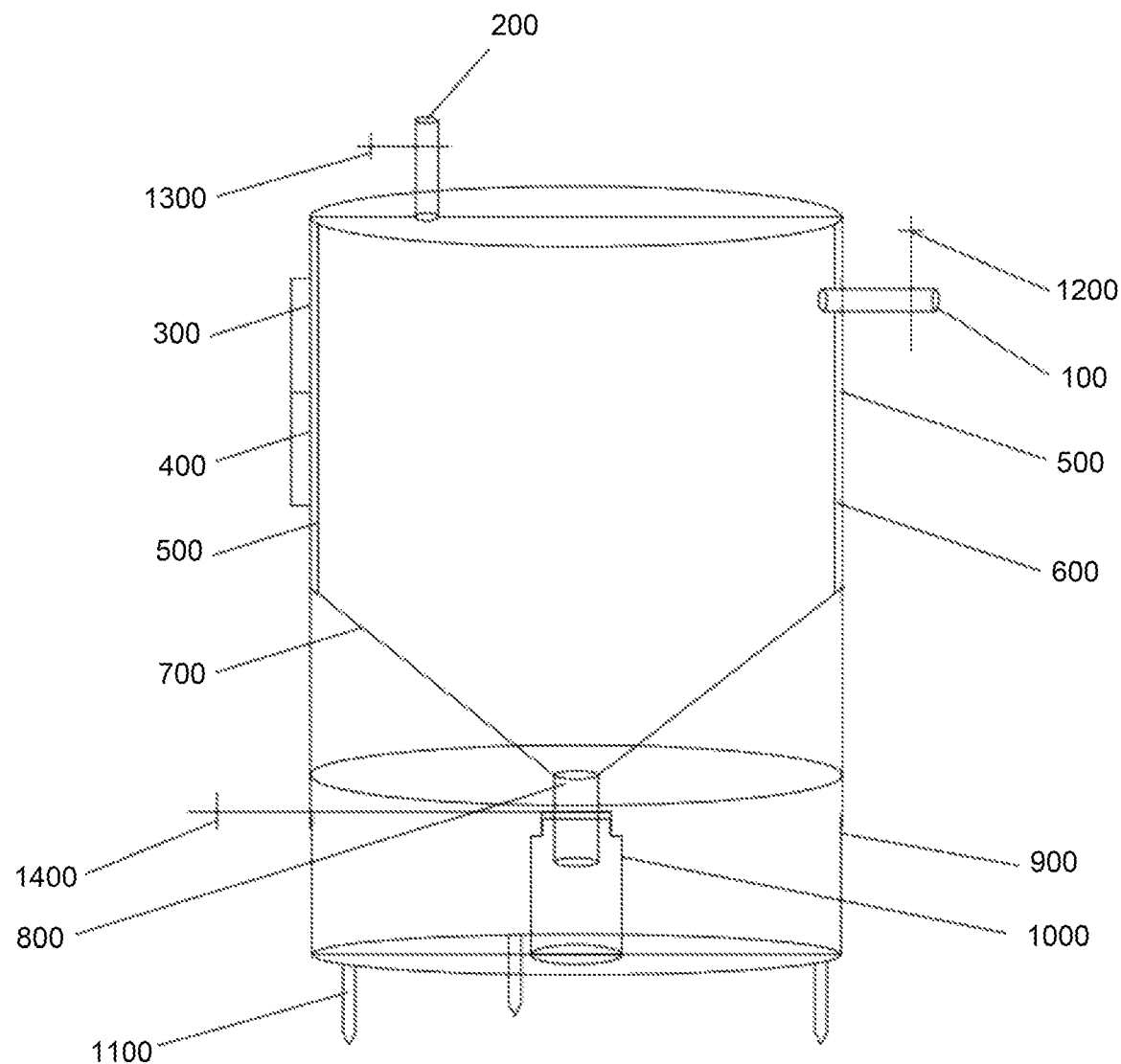
FIG. 1 is an integral structural schematic diagram of the present disclosure.
Figure 2:
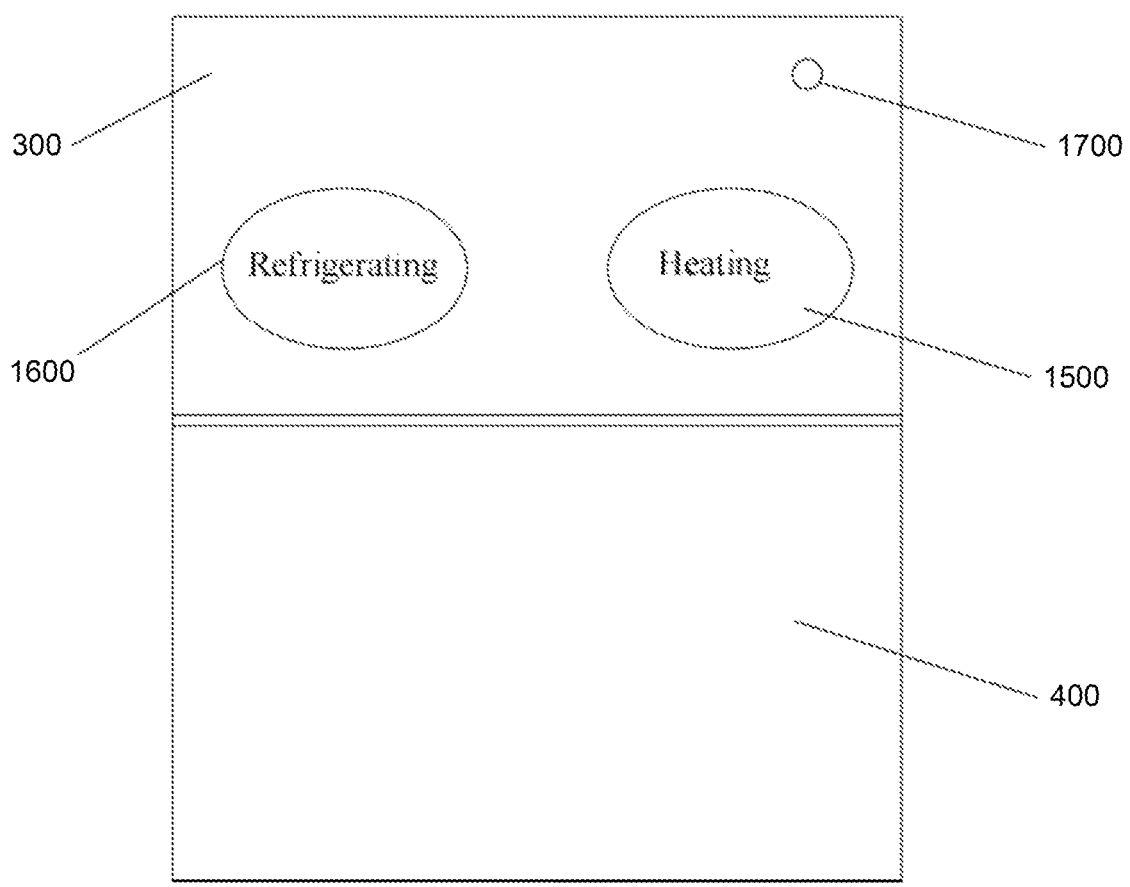
FIG. 2 is a structural schematic diagram of a control device and an energy device in the present disclosure.

Referring to FIG. 1 and FIG. 2, the present disclosure relates to an air moisture collection device, and relates to collection and measurement of the moisture in the air near the ground in soil porosity. The air moisture collection device comprises a shell 500, an inner container 700, a control device 300, an energy device 400, a condensing device 600, a heating device, a heat dissipating device, a water collecting bottle 1000, a water outlet pipe 800, a base 900 and supporting columns 1100.

The outer shell 500 is a cylinder, the inner container 700 is installed in the outer shell 500, the bottom of the outer shell 500 is in threaded connection with the top of the base 900, the base 900 is designed without a top surface, the water collecting bottle 1000 is installed in the base 900, the exhaust pipe 200 is arranged at the top of the outer shell 500, the air inlet pipe 100 is arranged on the side wall of the outer shell 500, and the exhaust pipe 200 and the air inlet pipe 100 both communicate with the interior of the inner container 700.

The inner container 700 is integrally formed, the upper part of the inner container 700 is cylindrical, and the lower part of the inner container 700 is inversely conical. A cavity is formed in the inner container 700, and a hydrophobic layer is arranged on the inner wall of the inner container 700 and made of a super-hydrophobic material, so that condensed water can be conveniently and rapidly collected; a gap between the inner container 700 and the shell 500 is vacuum, the condensing device 600 and the heating device are arranged between the inner container 700 and the shell 500, a water outlet pipe 800 with external threads is arranged at the inverted-cone top of the lower portion of the inner container 700 and is in threaded connection with the water collecting bottle 1000, and the opening end of the water outlet pipe 800 is located in the water collecting bottle 1000 so that the condensed water is conveniently collected.

The condensing device 600 comprises a plurality of first semiconductor chilling plates, the heating device comprises a plurality of second semiconductor chilling plates, the refrigerating surfaces of the first semiconductor chilling plates are tightly attached to the outer wall of the inner container 700, and the heating surfaces of the first semiconductor chilling plates are tightly attached to the inner wall of the shell 500; and the heating surfaces of the second semiconductor chilling plates are tightly attached to the outer wall of the inner container 700, and the refrigerating surfaces of the second semiconductor chilling plates are tightly attached to the inner wall of the shell 500. All the first semiconductor chilling plates and all the second semiconductor chilling plates are connected with the energy device 4. According to the working principle of the semiconductor chilling plates, the condensing device 600 and the heating device are designed respectively, the condensing device 600 and the heating device are uniformly distributed between the inner wall of the shell 500 and the cylindrical outer wall of the upper portion of the inner container 700, and the second semiconductor chilling plates and the first semiconductor chilling plates are arranged in a staggered mode.

The heat dissipating device is composed of a fan and a silicone grease layer, one end of the fan is tightly attached to the semiconductor chilling plates of the condensing device 600 through the silicone grease layer, and the other end of the fan is fixed to the shell 500, so that the purpose of rapid heat dissipation is achieved.

The control device 300 is connected with the outer wall of the shell 500, the control device 300 comprises a heating button 1500 and a refrigerating button 1600 which are respectively used for controlling the condensing device 600 and the heating device, the refrigerating button 1600 is connected with all the first semiconductor chilling plates, and the heating button 1500 is connected with all the second semiconductor chilling plates. The heating button 1500 is a red button, the refrigerating button 1600 is a blue button, the heating button 1500 and the refrigerating button 1600 are respectively marked with words of heating and refrigerating, and the refrigerating button 1600 is simultaneously connected with the heat dissipating device and used for turning on or turning off the heat dissipating device.

The energy device 400 comprises a battery placing box, a storage battery and an electric quantity indicating lamp 1700, the electric quantity indicating lamp 1700 is installed on the outer wall of the control device 300 and electrically connected with the storage battery, the storage battery is detachably placed in the battery placing box and conveniently provides power support for the condensing device 600, the heating device and the heat dissipating device for a long time, and the battery placing box is connected with the outer wall of the shell 500. When the electric quantity of the storage battery is sufficient, the electric quantity indicating lamp 1700 is green; when the electric quantity of the storage battery is reduced to below 20%, the electric quantity indicating lamp 1700 is yellow; and when the electric quantity of the storage battery is reduced to 5%, the electric quantity indicating lamp 1700 turns red to remind a user to replace the storage battery in time.

Meanwhile, the shell 500 and the inner container 700 in the embodiment are both made of high-strength stainless steel materials, and the influence of the materials on water vapor is prevented. The exhaust pipe 200, the air inlet pipe 100 and the water outlet pipe 800 are respectively provided with an exhaust pipe sealing valve 1300, an air inlet pipe sealing valve 1200 and a water outlet pipe sealing valve 1400, so that the final purpose is realized conveniently, and the operation is facilitated. The base is provided with the three supporting columns 1100, in the embodiment, the supporting columns 1100 are achieved through steel nails, and the steel nails can easily stretch into soil, so that installation and placement under different outdoor conditions are facilitated. Meanwhile, when the threads at the joint of the base 900 and the shell 500 are screwed to tightest, a certain distance is formed between the inner bottom surface of the base 900 and the bottom of the water collecting bottle 1000, and the water collecting bottle 1000 is prevented from being squeezed.

A specific using method of the air moisture collection device of the present disclosure comprises the following steps:

Step one, cleaning the inner container 700.

In the embodiment, enough purified water or distilled water needs to be prepared, the base 900 and the water collecting bottle 1000 of the whole device are detached, the air inlet pipe sealing valve 1200 and the exhaust pipe sealing valve 1300 are closed, the water outlet pipe sealing valve 1400 is opened, the prepared water is poured into the whole inner container from the water outlet pipe 800 and fully shaken, and then the water outlet pipe sealing valve 1400 is closed after the water is poured out from the water outlet pipe 800.

Step two, installing and fixing devices.

In the embodiment, the base 900 is placed at a relatively flat section, so that the supporting columns 1100 are inserted below the bottom surface to provide stable support for the whole device; the water collecting bottle 1000 is screwed on the water outlet pipe 800, and the air inlet pipe sealing valve 1200, the exhaust pipe sealing valve 1300 and the water outlet pipe sealing valve 1400 are closed; and the device provided with the water collecting bottle 1000 is fixedly installed on the base 900 through bottom threads in a tightening manner.

Step three, extracting vacuum.

Figure 3:
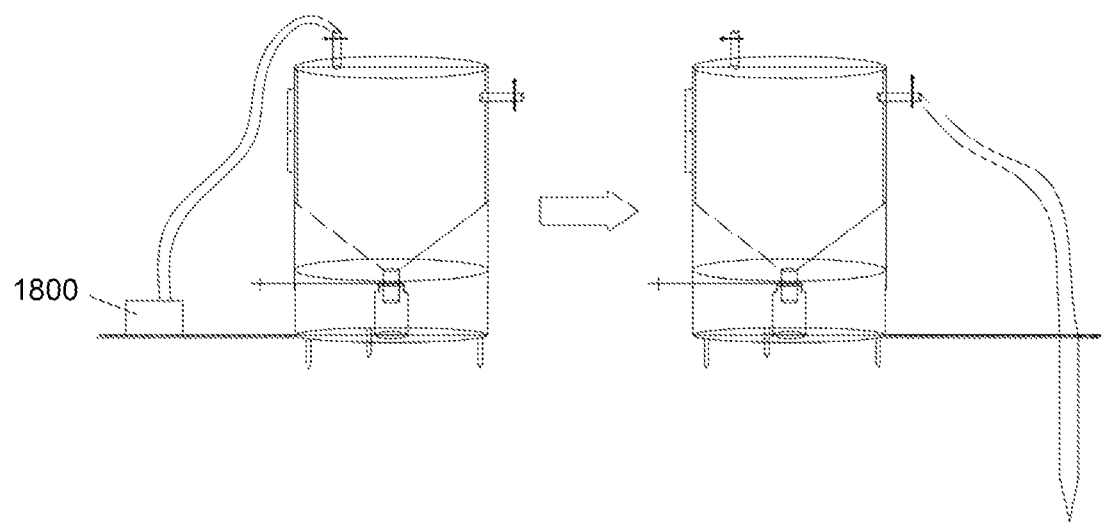
FIG. 3 is a schematic diagram of the usage state of the present disclosure.

In this embodiment, referring to FIG. 3, the exhaust pipeline of the exhaust pump 1800 is connected with the exhaust pipe 200, the exhaust pipe sealing valve 1300 is opened, and the exhaust pump 1800 is turned on to work. In the embodiment, when air is extracted, the heating button 1500 is turned on to completely evaporate and extract water left on the inner container 700 during cleaning, and when the inner container 700 is in a vacuum state, the exhaust pipe sealing valve 1300 is closed, and the exhaust pump 1800 and the heating button 1500 are turned off.

Step four, collecting air moisture.

In the embodiment, a sampler is inserted into a target horizon and connected with the air inlet pipe 100 (the sampler is not used when air moisture on the ground is taken), the refrigerating button 1600 and the air inlet pipe sealing valve 1200 of the control device 300 are turned on, after refrigeration is carried out for a period of time (frost is formed on the inner wall of the inner container 700 when the temperature difference is extremely large), the water outlet pipe sealing valve 1400 is turned on, condensed water in the inner container 700 enters the water collecting bottle 1000 through the water outlet pipe 800, and when the required water is collected in the water collecting bottle 1000, the refrigerating button 1600 can be turned off, and the water number of the water collecting bottle 1000 is stored. If the water quantity collected at one time is not enough to be required by the experiment, only the water outlet pipe sealing valve 1400 is closed without closing the refrigerating button 1600, a new water collecting bottle 1000 is changed to the water outlet pipe 800 to be installed, and the water outlet pipe sealing valve 1400 is opened to collect the water again until the required water quantity is collected.

In conclusion, the air moisture collection device and method can achieve collection of air moisture at the precise horizon, the air moisture is directly inserted into the target horizon through a guide pipe, the sampling precision is improved, large-area excavation is avoided, soil disturbance is reduced, and high-frequency detection is facilitated. The semiconductor chilling plates are adopted for refrigeration and heating, vapor water is rapidly, repeatedly and accurately collected from different horizons in a short time in the field, the manual workload is effectively reduced, and the device is convenient to operate in the field, low in cost and high in practicability.

The above content is only used for explaining the technical idea of the present disclosure, the protection range of the present disclosure cannot be limited according to the technical idea, and any modification made on the basis of the technical scheme according to the technical idea provided by the present disclosure falls within the protection range of the claims of the present disclosure.

What is claimed is:

1. An air moisture collection device, comprising an air inlet pipe (100), an exhaust pipe (200), a control device (300), an energy device (400), a heating device, a shell (500), a condensing device (600), a water outlet pipe (800) and a base (900), wherein a bottom of the shell (500) is connected with a top of the base (900), an inner container (700) is arranged in the shell (500), a water collecting bottle (1000) is arranged in the base (900), a bottom of the inner container (700) communicates with the water collecting bottle (1000) through the water outlet pipe (800), and the water outlet pipe (800) is provided with a water outlet pipe sealing valve (1400); the condensing device (600) is arranged between the shell (500) and the inner container (700), one end of the condensing device (600) is attached to an inner wall of the shell (500), another end of the condensing device (600) is attached to an outer wall of the inner container (700), and the condensing device (600) is configured to condensing moisture in air inside the inner container (700); and the air inlet pipe (100), the exhaust pipe (200), the control device (300) and the energy device (400) are arranged on a side wall of the shell (500), the air inlet pipe (100) and the exhaust pipe (200) both communicate with an interior of the inner container (700), the air inlet pipe (100) is provided with an air inlet pipe sealing valve (1200), and the exhaust pipe (200) is provided with an exhaust pipe sealing valve (1300); and the control device (300) and the energy device (400) are both connected with the condensing device (600), the control device (300) is configured to opening or closing the condensing device (600), and the energy device (400) is configured to provide working energy for the condensing device (600);

the heating device is connected with the energy device (400) and the control device (300), wherein one end of the heating device is attached to the inner wall of the shell (500), another end of the heating device is attached to the outer wall of the inner container (700), the control device (300) is further configured to turn on or turn off the heating device, and the energy device (400) is further configured to provide working energy for the heating device;

wherein a gap between the inner container (700) and the shell (500) is vacuum;

the exhaust pipe sealing valve (1300) is configured to extract air in the inner container (700); when the air moisture collection device is ready for use, the exhaust pipe sealing valve (1300) is open, and the air inlet pipe sealing valve (1200) is closed; when the air moisture collection device obtains water in the air, the exhaust pipe sealing valve (1300) is closed, and the air inlet pipe sealing valve (1200) is open.

2. The air moisture collection device according to claim 1, wherein the condensing device (600) comprises a plurality of first semiconductor chilling plates, the heating device comprises a plurality of second semiconductor chilling plates, refrigerating surfaces of the first semiconductor chilling plates are attached to the outer wall of the inner container (700), and heating surfaces of the first semiconductor chilling plates are attached to the inner wall of the shell (500); heating surfaces of the second semiconductor chilling plates are attached to the outer wall of the inner container (700), and refrigerating surfaces of the second semiconductor chilling plates are attached to the inner wall of the shell (500); and all the first semiconductor chilling plates and all the second semiconductor chilling plates are connected with the energy device (400).

3. The air moisture collection device according to claim 2, wherein the first semiconductor chilling plates and the second semiconductor chilling plates are distributed between the shell (500) and the inner container (700) in a staggered mode.

4. The air moisture collection device according to claim 1, wherein the energy device (400) comprises a battery placing box, a storage battery and an electric quantity indicating lamp (1700), the battery placing box is connected with the outer wall of the shell (500), the storage battery is located in the battery placing box and connected with the condensing device (600) and the electric quantity indicating lamp (1700), the electric quantity indicating lamp (1700) is arranged on an outer wall of the control device (300), the shell (500) or the battery placing box, and when an electric quantity of the storage battery is greater than or equal to 5% of a total electric quantity of the storage battery and smaller than 20% of the total electric quantity of the storage battery, the electric quantity indicating lamp (1700) is yellow; when the electric quantity of storage battery is smaller than 5% of the total electric quantity of the storage battery, the electric quantity indicating lamp (1700) is red; and the electric quantity of storage battery is greater than or equal to 20% of the total electric quantity of the storage battery, the electric quantity indicating lamp (1700) is green.

5. The air moisture collection device according to claim 1, wherein valve control ends of the air inlet pipe sealing valve (1200), the exhaust pipe sealing valve (1300) and the water outlet pipe sealing valve (1400) are all located outside the shell (500).

6. The air moisture collection device according to claim 1, wherein a hydrophobic layer is arranged on the inner wall of the inner container (700), and the shell (500) is a hollow reticular shell.

7. The air moisture collection device according to claim 1, further comprising a heat dissipating device, wherein the heat dissipating device comprises a fan and a silicone grease layer; one end of the fan is fixedly connected with the shell (500), and an other end of the fan is connected with the condensing device (600) through the silicone grease layer; and the fan is connected with the control device (300) and the energy device (400), the control device (300) is configured to turn on of turn off the fan, and the energy device (400) is further configured to provide working energy for the fan.

8. The air moisture collection device according to claim 1, wherein a plurality of supporting columns (1100) are arranged on a surface of the bottom of the base (900).

\* \* \* \* \*